(12) United States Patent
Christie et al.

(10) Patent No.: US 8,554,861 B2
(45) Date of Patent: Oct. 8, 2013

(54) METHOD AND APPARATUS FOR DISPLAYING INFORMATION DURING AN INSTANT MESSAGING SESSION

(75) Inventors: Gregory N. Christie, San Jose, CA (US); Peter T. Westen, Menlo Park, CA (US); Stephen O. Lemay, San Francisco, CA (US); Jens Alfke, San Jose, CA (US)

(73) Assignee: Apple Inc., Cupertino, CA (US)

( * ) Notice: Subject to any disclaimer, the term of this patent is extended or adjusted under 35 U.S.C. 154(b) by 183 days.

(21) Appl. No.: 12/726,247

(22) Filed: Mar. 17, 2010

(65) Prior Publication Data

US 2010/0185960 A1 Jul. 22, 2010

Related U.S. Application Data

(60) Continuation of application No. 11/688,664, filed on Mar. 20, 2007, which is a division of application No. 10/428,523, filed on May 2, 2003, now Pat. No. 7,669,134.

(51) Int. Cl.
*G06F 15/16* (2006.01)

(52) U.S. Cl.
USPC .......................................... 709/207; 715/715

(58) Field of Classification Search
USPC ............... 709/209, 204, 206, 207, 227–229; 715/700, 715, 733, 751, 757–759
See application file for complete search history.

(56) References Cited

U.S. PATENT DOCUMENTS

| | | | |
|---|---|---|---|
| 4,107,784 A | 8/1978 | Van Bemmelen | |
| 4,433,377 A | 2/1984 | Eustis et al. | |
| 4,485,439 A | 11/1984 | Rothstein | |
| 4,513,379 A | 4/1985 | Wilson et al. | |
| 4,555,775 A | 11/1985 | Pike | |
| 4,586,158 A | 4/1986 | Brandle | |
| 4,642,790 A | 2/1987 | Minshull et al. | |
| 5,287,448 A | 2/1994 | Nicol et al. | |

(Continued)

FOREIGN PATENT DOCUMENTS

| | | |
|---|---|---|
| JP | 9 259063 | 10/1997 |
| JP | 2003 233568 | 8/2003 |

(Continued)

OTHER PUBLICATIONS

Adium, "AboutAdium-Adium X-Trac," Aug. 19, 2007, 2 pages, http://web.archive.org/web/2007819113247/http://trac.adiumx.com/wiki/AboutAdium.

(Continued)

*Primary Examiner* — Saleh Najjar
*Assistant Examiner* — Eric W Shepperd
(74) *Attorney, Agent, or Firm* — Morgan, Lewis & Bockius LLP

(57) ABSTRACT

A method and an apparatus are provided for controlling a graphical user interface to display information related to a communication session. Information relating to data produced by a first participant to the communication session is displayed on a first display unit, wherein the information produced by the first participant is displayed at a first position on the first display unit. Data is received from a second participant to the communication session, and information relating to the data received from the second participant is displayed on the first display unit, wherein the information received from the second participant is displayed at a second position on the first display unit. The first and second positions are horizontally spaced apart.

3 Claims, 8 Drawing Sheets

(56) References Cited

U.S. PATENT DOCUMENTS

| | | | |
|---|---|---|---|
| 5,428,731 A | 6/1995 | Powers, III | |
| 5,617,539 A | 4/1997 | Ludwig et al. | |
| 5,724,985 A | 3/1998 | Snell et al. | |
| 5,758,079 A | 5/1998 | Ludwig et al. | |
| 5,854,893 A | 12/1998 | Ludwig et al. | |
| 5,880,731 A * | 3/1999 | Liles et al. | 715/758 |
| 5,884,039 A | 3/1999 | Ludwig et al. | |
| 5,896,500 A | 4/1999 | Ludwig et al. | |
| 5,917,487 A * | 6/1999 | Ulrich | 715/765 |
| 5,943,049 A * | 8/1999 | Matsubara et al. | 715/715 |
| 5,990,887 A * | 11/1999 | Redpath et al. | 715/758 |
| 6,018,711 A * | 1/2000 | French-St. George et al. | 704/275 |
| 6,232,966 B1 * | 5/2001 | Kurlander | 715/764 |
| 6,237,025 B1 | 5/2001 | Ludwig et al. | |
| 6,268,859 B1 * | 7/2001 | Andresen et al. | 345/421 |
| 6,351,762 B1 | 2/2002 | Ludwig et al. | |
| 6,434,604 B1 * | 8/2002 | Harada et al. | 709/207 |
| 6,437,818 B1 | 8/2002 | Ludwig et al. | |
| 6,583,806 B2 | 6/2003 | Ludwig et al. | |
| 6,594,688 B2 | 7/2003 | Ludwig et al. | |
| 6,631,186 B1 | 10/2003 | Adams et al. | |
| 6,662,023 B1 | 12/2003 | Helle | |
| 6,704,015 B1 | 3/2004 | Bovarnick et al. | |
| 6,724,370 B2 | 4/2004 | Dutta et al. | |
| 6,772,195 B1 * | 8/2004 | Hatlelid et al. | 709/204 |
| 6,784,901 B1 * | 8/2004 | Harvey et al. | 715/757 |
| 6,910,186 B2 * | 6/2005 | Kim | 715/706 |
| 6,915,138 B2 | 7/2005 | Kraft | |
| 6,932,708 B2 | 8/2005 | Yamashita et al. | |
| 7,072,941 B2 | 7/2006 | Griffin et al. | |
| 7,115,035 B2 * | 10/2006 | Tanaka | 463/42 |
| 7,152,093 B2 | 12/2006 | Ludwig et al. | |
| 7,206,809 B2 | 4/2007 | Ludwig et al. | |
| 7,218,943 B2 | 5/2007 | Klassen et al. | |
| 7,386,799 B1 * | 6/2008 | Clanton et al. | 715/758 |
| 7,412,470 B2 | 8/2008 | Masuno et al. | |
| 7,433,921 B2 | 10/2008 | Ludwig et al. | |
| 7,478,129 B1 | 1/2009 | Chemtob | |
| 7,620,407 B1 | 11/2009 | Donald et al. | |
| 7,669,134 B1 | 2/2010 | Christie et al. | |
| 7,710,262 B2 | 5/2010 | Ruha | |
| 7,743,188 B2 | 6/2010 | Haitani et al. | |
| 7,877,705 B2 | 1/2011 | Chambers et al. | |
| 2002/0035467 A1 * | 3/2002 | Morimoto et al. | 704/9 |
| 2002/0054094 A1 | 5/2002 | Matsuda | |
| 2003/0078969 A1 * | 4/2003 | Sprague et al. | 709/204 |
| 2003/0079024 A1 | 4/2003 | Hough et al. | |
| 2003/0152203 A1 | 8/2003 | Berger et al. | |
| 2004/0021676 A1 | 2/2004 | Chen et al. | |
| 2004/0100479 A1 | 5/2004 | Nakano et al. | |
| 2004/0125088 A1 | 7/2004 | Zimmerman et al. | |
| 2004/0199663 A1 | 10/2004 | Horvitz et al. | |
| 2004/0210634 A1 * | 10/2004 | Ferrer et al. | 709/204 |
| 2004/0215731 A1 | 10/2004 | Tzann-en Szeto | |
| 2004/0223485 A1 | 11/2004 | Arellano et al. | |
| 2005/0086605 A1 | 4/2005 | Ferrer et al. | |
| 2005/0144568 A1 | 6/2005 | Gruen et al. | |
| 2005/0210394 A1 | 9/2005 | Crandall et al. | |
| 2005/0278643 A1 | 12/2005 | Ukai et al. | |
| 2006/0001652 A1 | 1/2006 | Chiu et al. | |
| 2006/0152496 A1 | 7/2006 | Knaven | |
| 2006/0168539 A1 | 7/2006 | Hawkins et al. | |
| 2006/0174207 A1 | 8/2006 | Deshpande | |
| 2006/0184886 A1 | 8/2006 | Chung et al. | |
| 2006/0205432 A1 | 9/2006 | Hawkins et al. | |
| 2006/0253787 A1 | 11/2006 | Fogg | |
| 2007/0083623 A1 | 4/2007 | Nishimura et al. | |
| 2007/0132738 A1 | 6/2007 | Lowles et al. | |
| 2007/0173267 A1 | 7/2007 | Klassen et al. | |
| 2007/0182595 A1 | 8/2007 | Ghasabian | |
| 2007/0213099 A1 | 9/2007 | Bast | |
| 2007/0226652 A1 | 9/2007 | Kikuchi et al. | |
| 2008/0114841 A1 | 5/2008 | Lambert | |
| 2008/0222118 A1 | 9/2008 | Scian et al. | |
| 2009/0007001 A1 | 1/2009 | Morin et al. | |
| 2009/0106376 A1 | 4/2009 | Tom et al. | |
| 2009/0138828 A1 | 5/2009 | Schultz et al. | |
| 2010/0164897 A1 | 7/2010 | Morin et al. | |

FOREIGN PATENT DOCUMENTS

| | | |
|---|---|---|
| WO | WO 98/33111 A1 | 7/1998 |
| WO | WO 03/056789 A1 | 7/2003 |
| WO | WO 2006/020305 A2 | 2/2006 |

OTHER PUBLICATIONS

Apple, "Welcome to Tiger," copyright © 2005 Apple Computer, inc., 32 pages, http://manuals.info.apple.com/en/Welcome_to_Mac_OS_X_v10.4_Tiger.pdf.

Chartier, D., "Using Multi-Network Meebo Chat Service on Your iPhone," tuaw.com, posted Jul. 4, 2007, 5 pages, http://www.tuaw.com/2007/07/04/using-multi-network-meebo-chat-service-on-your-iphone/.

del Strother, Jonathan, "CoverFlow," http://www.steelskies.com/coverflow, printed Jun. 15, 2006, 14 pages.

Gmail, "About Group Chat," Nov. 26, 2007, 2 pages, http://mail.google.com/support/bin/answer.py?answer=81090.

iChat AV, "Videoconferencing for the Rest of Us," Apr. 13, 2006, 3 pages, http://www.apple.com/macosx/features/ichat.html.

iPhone Hacks, "Native Phone MMS Application Released," downloaded Dec. 25, 2007, http://www.iphonehacks.com/2007/12/iphone-mms-app.html.

Padilla, A., Palm Treo 750 Cell Phone Review-Messaging published Mar. 17, 2007, 6 pages. http://www.wirelessinfo.com/content/palm-Treo-750-Cell-Phone-Review/Messaging.html.

Palm User Guide 755p. ® 2005-2007, 304 pages.

Publictivity, "iPhoneChat-iChat for iPhone in Javascript," Dec. 25, 2007, 2 pages, http://www.publictivity.com/iPhoneChat/.

Tidwell, J., "Animated Transition," from Designing interfaces, O'Reilly Media, Inc., Nov. 2005, pp. 84-85.

Wirelessinfo, "SMS/MMS Ease of Use (8.0)," Mar. 2007, 3 pages, http://www.wirelessinfo.com/content/palm-Treo-750-Cell-Phone-Review/Messaging.htm.

Zelig, "A Review of the Palm Treo 750v," Feb. 5, 2007, 3 pages, http://www.mtekk.com.au/Articles/tabid/54/articleType/ArticleView/articleId/769/A-Review-of-the-Palm-Treo-750v.aspx.

Invitation to Pay Additional Fees dated Apr. 29, 2008, received in International Application PCT/US2007/077424, which corresponds to U.S. Appl. No. 11/848,208, 6 pages (Lemay).

International Search Report dated Jun. 19, 2008, received in International Application No. PCT/US2007/077424, which corresponds to U.S. Appl. No. 11/848,208, 17 pages (Lemay).

Office Action dated Apr. 20, 2011, received in U.S. Appl. No. 11/848,208, 19 pages (Lemay).

Final Office Action dated Nov. 4, 2011, received in U.S. Appl. No. 11/848,208, 7 pages (Lemay).

Office Action dated Nov. 7, 2011, received in Canadian Patent Application No. 2,661,886, which corresponds to U.S. Appl. No. 11/848,208, 3 pages (Lemay).

Office Action dated Dec. 6, 2010, received in Chinese Application No. 200780041351.5, which corresponds to U.S. Appl. No. 11/848,208, 5 pages (Lemay).

Office Action dated Nov. 3, 2011, received in Chinese Patent Appiication No. 200780041351.5, which corresponds to U.S. Appl. No. 11/848,208, 14 pages (Lemay).

Office Action dated Aug. 3, 2012, received in Chinese Patent Application No. 200780041351.5. which corresponds to U.S. Appl. No. 11/848,208. 6 pages (Lemay).

Office Action dated Feb. 18, 2011, received in European Patent Application No. 07 841 749.0 which corresponds to U.S. Appl. No. 11/848,208, 4 pages (Lemay).

Examination Report dated Nov. 14, 2012, received in European Patent Application No. 07841749.0, which corresponds to U.S. Appl. No. 11/848,208, 5 pages (Lemay).

Office Action dated Sep. 14, 2011, received in Japanese Patent Application No. 2009-527503, which corresponds to U.S. Appl. No. 11/848,208, 7 pages (Lemay).

Decision to Grant dated Oct. 12, 2012, received in Japanese Patent Application No. 2009527503, which corresponds to U.S. Appl. No. 11/848,208, 4 pages (Lemay).
Office Action dated Oct. 19, 2011, received in U.S. Appl. No. 12/242,846, 19 pages (Christie).
Final Office Action dated Jun. 5, 2012, received in U.S. Appl. No. 12/242,846, 16 pages (Christie).
Office Action dated Jun. 13, 2012 received in U.S. Appl. No. 12/163,908, 21 pages (Christie).
Final Office Action dated Nov. 7, 2012, received in U.S. Appl. No. 12/163,908, 15 pages (Christie).
Ahuja et al., "Comparison of Application Sharing Mechanisms in Real-Time Desktop Conferencing Systems," AT&T Bell Laboratories, 1990, 11 pages.
Schooler, Eve, "A Distributed Architecture for Multimedia Conference Control," ISI Research Report (Nov. 1991), 20 pages.
Schooler et al., "A Packet-Switched Multimedia Conferencing System" ACM SIGOIS Bulletin, vol. 1, No. 1, pp. 12-22 (Jan. 1989).
Schooler at al., "An Architecture for Multimedia Connection Management" Proceedings IEEE 4th Comsoc International Workshop on Multimedia Communications: Mm '92, pp. 271-274 (Apr. 1992), 6 pages.
Lantz, Keith, "An Experiment in Integrated Multimedia Conferencing," CSCW '86 Proceeding of the 1986 ACM conference on Computer-supported cooperative work, 1986, 10 pages.
Kaeppner et al., "Architecture of Heiphone: A Testbed for Audio/Video Teleconferencing," IBM European Networking Center, 1993, 17 pages.
Schooler, Eve, "Case Study: Multimedia Conference Control in a Packet-switched Teleconferencing Systems," Journal of Internetworking, Research and Experience; vol. 4, pp. 99-120 (Jun. 1993), 18 pages.
Srinivas et al., "MONET: A Multi-media System for Conferencing and Application Sharing in Distributed Systems," CERC Technical Report Series Research Note, Concurrent Engineering Research Center; Feb. 1992, 19 pages.
Lauwers et al., "Collaboration Awareness in Support of Collaboration Transparency: Requirements for the Next Generation of Shared Window Systems," CHI '90 Proceedings, Apr. 1990, 9 pages.
Muller et al., "CSCW '92 Demonstrations," CSCW Proceedings, Nov. 1992, 4 pages.
Root Robert., "Design of a Multi-Media Vehicle for Social Browsing," CSCW '88, Proceedings of the 1988 ACM conference of Computer-supported cooperative work, 1988, 14 pages.
Watabe et al., "Distributed Multiparty Desktop Conferencing System: Mermaid," CSCW '90 Proceedings; Oct. 1990, 10 pages.
Buxton et al, "Europarc's Integrated Interactive Intermedia Facility (iiif): Early Experiences," Elsevier Science Publishers B. V. (North-Holland); 1990, pp. 11-34.
Forsdick, Harry, "Explorations into Real-Time Multimedia Conferencing," in Proceedings 2nd International Symposium on Computer Message Systems (1985), 17 pages.
Elliot, Chip, "High-Quality Multimedia Conferencing Through a Long-Haul Packet Network," Muitimedia '93 Proceedings of the first ACM international conference on Multimedia, 1993, 8 pages.
Jeffay et al., "Kernel Support for Live Digital Audio and Video," In Proc. of the Second International Workshop on Network and Operating System Support for Digital Audio and Video, Nov. 1991, 14 pages.
Crowley, et al., "Mm Conf: An Infrastructure for Building Shared Muitimedia Appiications," CSCW 90 Proceedings (Oct. 1990), 14 pages.
Kjelldahl et al., "Multimedia—Principles, Systems and Applications," Proceedings of the 1991 Eurographics Workshop on Multimedia Systems, Applications: and Interaction; Stockholm, Sweden. Apr. 1991, 14 pages.
Casner et al., "N-Way Conferencing with Packet Video," Proceedings of the Third International Workshop on Packet Video, Mar. 22-23, 1990, 7 pages.
Gaver et al., "One is not Enough: Multiple Views in a Media Space," INTERCHI'93, Apr. 24-29, 1993, 7 pages.
Hopper, Andy, "Pandora—an experimental system for multimedia applications," Operating Systems Review, Jan. 12, 1990, 16 pages.

Kirstein et al., "Piloting of Multimedia integrated Communications for European Researchers (MICE)," International Networking Conference INET'93, San Francisco, CA, Aug. 1993, 66 pages.
Dourish et al., "Portholes: Supporting Awareness in a Distributed Work Group," Chi 1992; May 3-8, 1992, 7 pages.
Gaver et al., "Realizing a Video Environment: Europarc's Rave System," CHI'92, May 3-7, 1991, 7 pages.
Huang et al., "Reel-Time Software-Based Video Coder for Multimedia Communication System," Multimedia '93 Proceedings of the first ACM international conference on Muitimedia, 1993, 10 pages.
Petterson et al., "Rendezvous: An Architecture for Synchonous Multi-User Applications," CSCW '90 Proceedings; Oct. 1990, 10 pages.
Lauwers et al., "Repiicated Architectures for Shared Window Systems: A Critique," COCS '90 Proceedings of the ACM SIGOIS and EEE CS TC-OA conference on Office information systems, ACM SIGOIS Bulletin, vol. 11, issue 2-3, Apr. 1990, 12 pages.
Pearl, Amy, "System Support for Integrated Desktop Video Conferencing," Sun Microsystems Laboratories; Dec. 1992, 15 pages.
Ishii, Hiroshi, "TeamWorkStation: Towards a Seamless Shared Workspace," CSCW '90 Proceedings; Oct. 1990, 14 pages.
Schooler et al., "The Connection Contorl Protocol: Architecture Overview," USC/Information Sciences Institute (Jan. 28, 1992), 6 pages.
Schooler, Eve "The Impact of Scaling on a Muitimedia Connection Architecture," ACM Journal of Multimedia Systems; vol. 1; No. 1; pp. 2-9 (1993).
Turietti, Thierry, "The INRIA Videoconferencing System (IVS)," ConneXions, vol. VIII, No. 10, Oct. 1994, 10 pages.
Phillips et al., "The Multi Media Workstation," Panel Session, SIGGRAPH '89 Panel Proceedings, 1989, 17 pages.
Arango et al., "Touring Machine: A Software Platform for Distributed Multimedia Applications," 1992 IFIP International Conference on Upper Layer Protocols, Architectures and Applications, May 1992, 11 pages.
Lantz et al., "Towards a Universal Directory Service," Department of Computer Science and Electrical Engineering, Stanford University, Aug. 1985, 11 pages.
Egido, Carmen, "Videoconferencing as a Technology to Support Group Work: A Review of its Failure," CSCW '88, Proceedings of the 1988 ACM conference on Computer-supported cooperative work, 1988, 12 pages.
Touch, Joseph, "Zoned Analog Personal Teleconferencing (ZAPT)," USC/Information Sciences Institute, 1993, 19 pages.
Meyrowitz, N. et al., "Bruwin: An Adaptable Design Strategy for Window Manager/Virtual Terminal Systems," Department of Computer Science, Brown University (1981); pp. 180-189.
Scheifler et al., "The X Window System," ACM Transactions on Graphics, vol. 5, No. 2, Apr. 1986, pp. 79-109.
Wadlow, M.G.; The Role of Human Interface Guidelines in the Design of Multimedia Applications, Carnegie Mellon University (To be Published in Current Psychology: Research and Reviews, Summer 1990) pp. 1-22 (CMU-ITC-91-101).
Morris, James H. et al.; Andrew: A Distributed Personal Computing Environment; Communications on the ACM, (Mar. 1986); vol. 29 No. 3, pp. 284-201.
Howard, John H.; (Abstract) An Overview of the Andrew File System; Information Technology Center, Carnegie Mellon University; (CMU-ITC-88-062); pp. 1-6 (CMU-ITC-88-062) (To Appear in a future issue of the ACM Transactions on Computer Systems.
Borenstein, Nathaniel S.; Information Technology Center and Computer Science Department, Carnegie Mellon University; Thyberg, Chris A. Academic Computing, Carnegie Mellon University: Cooperative Work in the Andrew Message System; (1988) pp. 306-323.
Trowbridge, David: Center for Design of Educational Computing, Carnegie-Mellon University; "Using Andrew for Development of Educational Applications," pp. 1-6 (CMU-ITC-858-065).
Paiay, Andrew J., et al.; Information Technology Center, Carnegie-Mellon University; "The Andrew Toolkit: An Overview," pp. 1-15.
Raper, Larry K., The C-MU PC Server Project (Dec. 1986) pp. 1-30 (CMU-ITC-86-051).

Gruhn, A.M. and Hohl, A. C.; A Research Perspective on Computer-Assisted Office Work; (1979) IBM Syst. J. vol. 18, No. 3, pp. 432-456.

Bieher, J. H., et al.; A Graphic Interactive Application Monitor; IBM Syst. J., vol. 19, No. 3 (1980) pp. 382-402.

Gardner, P.C.; A System for the Automated Office Environment; IBM Syst. J., vol. 20, No. 3, (1981) pp. 321-345.

Bretts, B., et al., Goals and Objectives for User Interface Software; Computer Graphics, vol. 21, No. 2, (Apr. 1987) pp. 73-78.

Conklin, Jeffrey; A Survery of Hypertext; MCC Software Technology Program (Dec. 1987); pp. 1-38.

Halbert, D.C.; Programming by Example; Dept. Electrical Engineering and Comp. Sciences, University of California, Berkley, (Nov. 1984) pp. 1-76.

Walker, B., et al., The LOCUS Distributed Operating System; University of California Los Angeles (1983) pp. 49-70.

Hill, R.D.; Some Important Features and Issues in User Interface Management System; Dynamic Graphics Project, University of Toronto, CSRI, vol. 21, No. 2 (Apr. 1987); pp. 116-120.

Croft, W. Bruce and Lefkowitz, Lawrence S.; Task Support In an Office System; Computer and Information Science Department, University of Massachusetts, (1984) pp. 22-24.

Fisher, S.S., et al., Virtual Environment Display System; Interactive 3D Graphics (Oct. 23-24, 1986) pp. 77-87.

Ziegler, K., Jr.; A Distributed Information System Study; IBM Syst. J., vol. 18 No. 3 (1979).

Meyer, Mike; A Shell for Modern Personal Computers; University of California; pp. 13-19.

Trigg, R. H. and Irish, P.M.; Hypertext Habitats: Experiences of Writers in NoteCards; Hypertext '87 Papers; Intelligent Systems Laboratory, Xerox Palo Alto Research Center; pp. 89-108.

Donahue, James; Widom, Jennifer; Whiteboards: A Graphical Database Tool: ACM Transactions on Office Information Systems, vol. 4, No. 1, Jan. 1986, pp. 24-41.

Rosenberg, J. et al., An Overview of the Andrew Message System; Information Technology Center Carnegie-Mellon University; (Jul. 1987); pp. 99-108.

Morland, D. Verne; Human Factors Guidelines for Terminal Interface Design; Communications of the ACM (Jul. 1983) vol. 26, No. 7, pp. 484-494.

Good, Michael D., et al.; Building a User-Derived Interface; Communications of the ACM; (Oct. 1984) vol. 27, No. 10; pp. 1032-1043.

Smith, Sidney L. and Mosier, Jane D.; Guidelines for Designing User Interface Software; UserLab, Inc. (Aug. 1986); pp. 1-384.

Schooler et al., "Multimedia Conferencing: Has it come of age?" Reprinted from the Proceedings 24th Hawaii International Conference on System Sciences, vol. 3, pp. 707-716 (Jan. 1991).

* cited by examiner

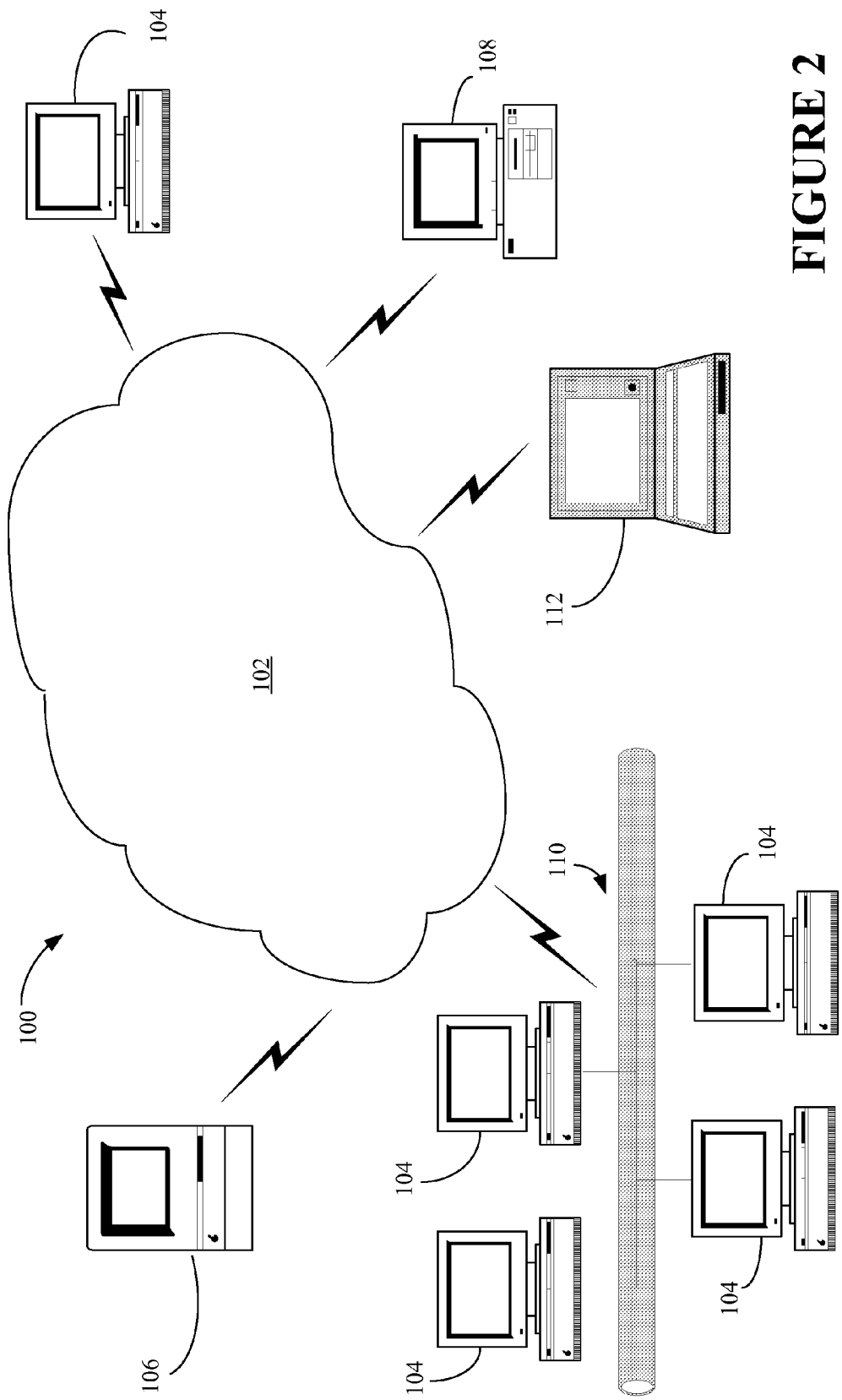

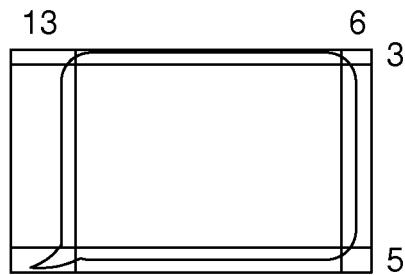
FIGURE 9A
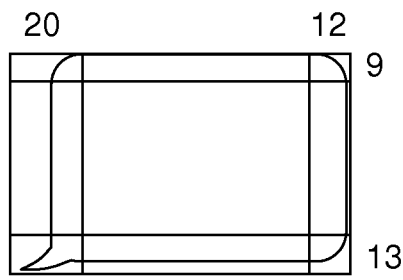
FIGURE 9B
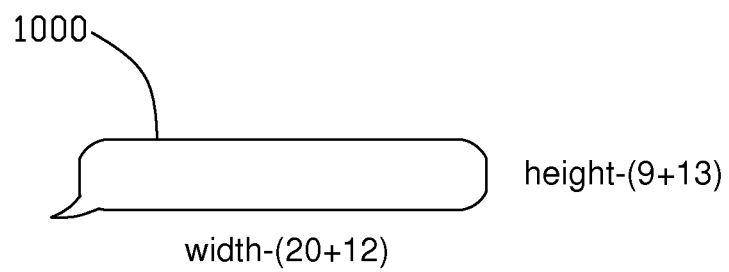
FIGURE 10A
FIGURE 10B

US 8,554,861 B2

METHOD AND APPARATUS FOR DISPLAYING INFORMATION DURING AN INSTANT MESSAGING SESSION

CROSS-REFERENCE TO RELATED APPLICATIONS

This application is a continuation of co-pending divisional application Ser. No. 11/688,664, filed Mar. 20, 2007, which is a divisional of application Ser. No. 10/428,523 filed on May 2, 2003 now U.S. Pat. No. 7,669,134.

BACKGROUND OF THE INVENTION

1. Field of the Invention

This invention relates generally to a user interface for displaying an exchange of messages during an instant messaging session, and, more particularly, to a method and apparatus for displaying instant message exchanges in a manner that graphically differentiates the participants in a conversation.

2. Description of the Related Art

Networks, such as the Internet, intranets, or other private or public networks, are ubiquitous. In fact, many computers are connected to one or more networks at the same time. For example, a business may have hundreds or even thousands of computers coupled to its own private network, which was, at least initially, used primarily for storage and exchange of computer files. At least some of these same business computers may also be coupled to the internet. Further, with the development of wireless devices, ad hoc networks may also be formed with properly configured portable devices. Even telephonic devices, such as cellular phones, pagers and the like, may be coupled to one or more of these networks. Small businesses and homes are also often connected in similar arrangements.

All of this connectivity has naturally led to communications between various users over these networks. For example, electronic mail (e-mail), because of its usefulness, is now commonplace. E-mail is now widely used by businesses and individuals, and in at least some instances has replaced more traditional forms of communications, such as mailed fetters, facsimiles, telexes, and the like. However, e-mail has proven to be somewhat awkward when used to carry on an ongoing conversation.

Instant messaging, on the other hand, allows two or more users connected through these networks to carry on an interactive conversation. Exemplary instant messaging systems include Apple iChat, AOL Instant Messenger, Microsoft MSN Messenger, and the like. Typically, two or more users type in messages or select icons, which they send to one another. The receiving party(ies) may immediately respond with an appropriate message or icon. These instant messages are commonly all displayed in serial fashion, such as shown in FIG. 1, usually scrolling the user's screen from top to bottom. Commonly, each message is preceded by a label, such as BobbyD211 and Fred1432 in FIG. 1, indicating the identity of the author of the message. Heretofore, users have relied on these labels, or other limited indicia, to locate and identify messages from a particular party. Accordingly, it will be appreciated that the presentation of each message in substantially similar format makes it difficult to readily determine the authorship of one or more previous messages. Likewise, it is difficult to go back and quickly locate a previous message without reading through many previous messages.

The present invention is directed to overcoming or at least reducing one or more of the problems set forth above.

SUMMARY OF THE INVENTION

In one aspect of the present invention, a method is provided for displaying information related to a communication session. Information relating to data produced by a first participant to the communication session is displayed on a first display unit, wherein the information produced by the first participant is displayed at a first position on the first display unit. Data is received from a second participant to the communication session, and information relating to the data received from the second participant is displayed on the first display unit, wherein the information received from the second participant is displayed at a second position on the first display unit. The first and second positions are spatially distinct.

In another aspect of the present invention, a computer readable program storage device is provided and encoded with instructions that, when executed by a computer, performs a method. The method includes displaying information relating to data produced by a first participant to the communication session on a first display unit, wherein the information produced by the first participant is displayed at a first position on the first display unit. Data is received from a second participant to the communication session, and information relating to the data received from the second participant is displayed on the first display unit, wherein the information received from the second participant is displayed at a second position on the first display unit. The first and second positions are spatially distinct.

In still another aspect of the present invention, a graphical user interface for displaying information related to a communication session is provided. The interface is comprised of a first and a second spatially distinct region. The first region is adapted to display at least one message from a first participant to the instant messaging session. The second region is adapted to display at least one message from a second participant to the instant messaging session, and the first and second spatially distinct regions partially overlap and each include at least a portion that is free from overlapping.

In yet another aspect of the present invention, a method for displaying information related to a communication session is provided. Information relating to data produced by a participant to the communication session is received. The information received from the participant is then at least partially displayed within a speech balloon.

In still another aspect of the present invention, a graphical user interface for displaying information related to a communication session is provided. The graphical user interface comprises a first and second region, wherein the first region is adapted to display a speech balloon. The second region is adapted to display at least one message from a participant to the instant messaging session, wherein the second region is at least partially located within the first region.

BRIEF DESCRIPTION OF THE DRAWINGS

The invention may be understood by reference to the following description taken in conjunction with the accompanying drawings, in which like reference numerals identify like elements, and in which:

FIG. 2 illustrates a top-level diagram of one embodiment of a hardware system on which the present invention may be implemented;

FIG. 9 illustrates a typical format for a speech bubble; and

FIG. 10 illustrates a speech balloon that has been stretched or modified to accommodate a message.

Figure 1:
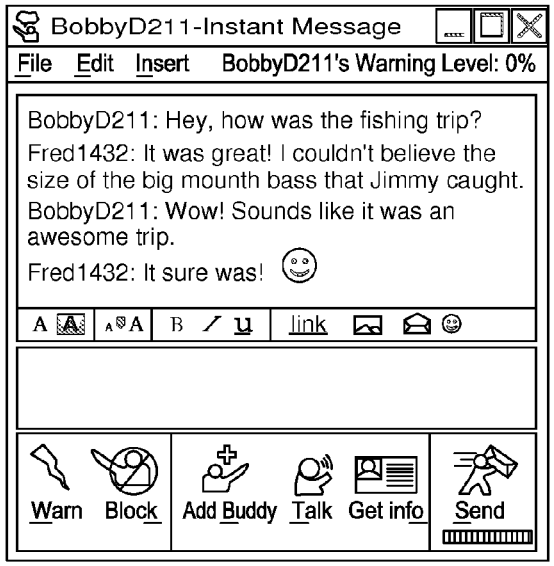
FIG. 1 illustrates a view of a screen representative of a graphical user interface of a prior art instant messaging system.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to FIG. 2, a block diagram depicting a system 100 in accordance with embodiments of the present invention is illustrated. The system 100 includes a plurality of computing devices coupled together through one or more network connections. For example, a plurality of devices may be coupled together via a private or public network, such as a local area network (LAN) 102 or the Internet. The actual connection between the devices and the LAN 102 may take on one or more of any of a variety of forms, such as a network interface card (NIC), a modem, a digital subscriber line (DSL), a cable modem, a wireless connection, and the like. The devices coupled to the LAN 102 may include, for example, desktop computers, such as an Apple Macintosh® 104, a classic Apple Mac® 106, an IBM compatible personal computer (PC) 108, and the like. Further, these desktop computers, such as the Apple Macintosh® 104, may be coupled together via a smaller sub-LAN 110, with the sub-LAN 110 being coupled to the LAN 102. Portable devices, such as the Apple PowerBook® or iBook® 112, may also be coupled to the LAN 102, either directly or as part of the sub-LAN 110. Further, other consumer devices, such as cell phones, personal data assistants (PDAs), network appliances, and other embedded devices may be connected to the LAN 102 so as to employ aspects of the instant invention.

While the invention has been illustrated herein as being useful in a network environment, it also has application in other connected environments. For example, two or more of the devices described above may be coupled together via device-to-device connections, such as by hard cabling, radio frequency signals (e.g., 802.11(a), 802.11(b), 802.11(g), Bluetooth, or the like), infrared coupling, telephone lines and modems, or the like. The instant invention may have application in any environment where two or more users are interconnected and capable of communicating with one another.

Those skilled in the art will appreciate that network connections may include a variety of other equipment, such as routers, switches, telephone modems, wireless devices, cable modems, digital subscriber lines, and the like. This type of equipment is not illustrated or discussed in detail herein so as to avoid unnecessarily obfuscating the instant invention. For purposes of understanding the instant invention, it is sufficient to recognize that additional conventional equipment of this type may be useful in establishing and maintaining communications between the various users.

Figure 4:
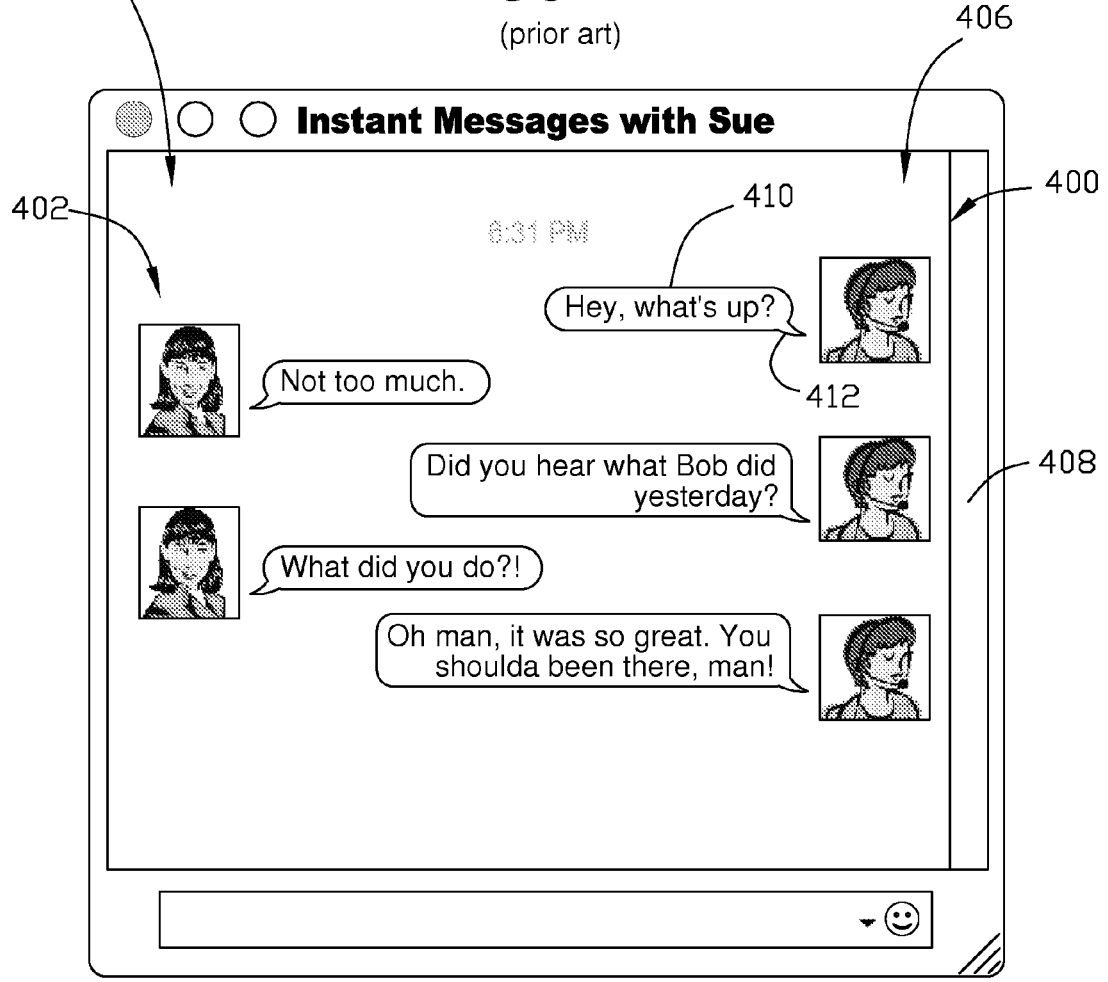
FIG. 4 illustrates a first view of an exemplary screen representative of a graphical user interface.
Figure 3:
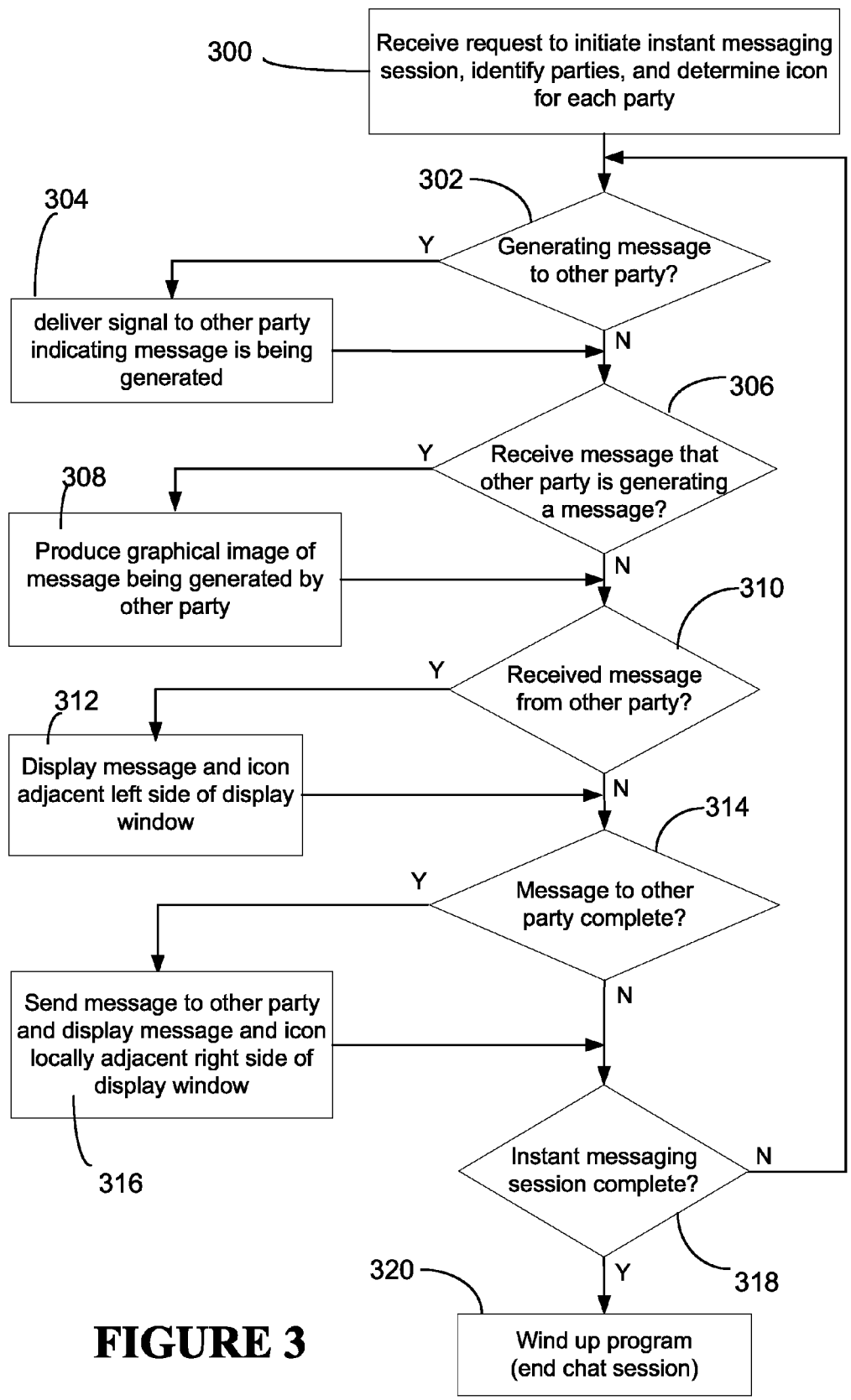
FIG. 3 illustrates a flowchart of an embodiment of a graphical user interface that may be executed by components within the system of FIG. 1 to produce the exemplary screens of FIGS. 4 and 5.

At least two of the devices in the system 100 have software, such as an application program, installed thereon to allow an instant messaging session to be initiated and conducted. An instant messaging session may include real-time or near real-time communications. FIG. 3 illustrates a flowchart of a portion of the software associated with initiating the instant messaging session and controlling a graphical user interface (GUI) used by the participants to the instant messaging session. In particular, the process begins at block 300 in a conventional manner with one of the two parties sending the other party an invitation to initiate an instant messaging session. Assuming that the other party accepts the invitation, the software on each party's computer initiates the GUI, which opens a window where both parties' messages and other pertinent information and controls are displayed. An exemplary representation of the GUI is shown in FIG. 4 and may be referenced simultaneous with the discussion of FIG. 3 herein for a more complete understanding of the operation of the instant invention.

The messages exchanged by the participants may contain information regarding an icon to be used to represent each party. For example, party A may select an icon, such as "Mary" 400 as a graphical representation of party A. Party B may receive and store the icon and then display it adjacent a message delivered by party A. The icon makes it easier for party B to more quickly identify those messages associated with party A. An exemplary exchange of messages in which party A has selected the icon "Mary" 400 and party B has selected the icon "Sue" 402 is shown in FIG. 4. Displaying unique graphical icons allows a user to readily identify the speaker with a quick glance. Additionally, displaying the icons adjacent each party's message allows the users to identify the speaker without looking away from the message region of the GUI. In an alternative embodiment, the user may elect to display not only the icon, but also the name associated with the author of the message. On the other hand, the user may elect to display only the name associated with the author of the message, preventing the icon from being displayed altogether, if desired.

Those skilled in the art will appreciate that the icons need not be delivered with each message. That is, party A may send an icon during the initial portion of the session, and party B will associate the icon with party A, store it locally, and then retrieve and display it each time a message is received from party A. Additionally, party A's icon may be overridden locally by party B. That is, party B may elect to display a different icon adjacent party A's messages, at least on the GUI viewed by party B. Party B may select any of a plurality of icons stored locally, and indicate through the local GUI, such as by pointing and clicking on various pull-down menus provided by the local GUI, that the selected icon should be used when displaying party A's messages.

The GUI may also use additional strategies to graphically differentiate the parties of the instant messaging session. For example, a sending party may send an indication of a color scheme in which his/her messages should be displayed. The receiving party may then, at his/her discretion, display the messages from the sender in the requested color scheme.

Alternatively, the receiving party may elect to override the sending parties requested preference, and instead display each party's message in its own distinct color. That is, party A, during an initialization phase, may indicate through the local GUI that any message received from party B should be displayed with red letters and a white background, and that any messages generated by himself, should be displayed with a yellow background and black letters. In either case, the color distinction allows the party to visually determine the author of a message without the need to read and understand an identifying name, such as is illustrated in the prior art at FIG. 1 (e.g., BobbyD211).

Allowing the sender to select the color and style, however, may lead to some confusion in the event that another participant to the instant messaging sessions elects a similar style and/or font. Empowering the receiver of the message to override locally the style and color choices indicated by the sender may help to alleviate any confusion. That is, the receiving party may elect to display the message with a different color and style than indicated by the sending party, at least on the GUI viewed by the receiving party. The receiving party may select any of a plurality of colors and styles stored locally, and indicate through the local GUI, such as by pointing and clicking on various pull-down menus provided by the local GUI, that the selected color and style should be used when displaying the received messages. Alternatively, the GUI may be programmed to automatically assign a different color to each participant.

An additional graphical distinction may be accomplished by partitioning the GUI into spatially distinct regions and then directing the messages to a region based upon its authorship. For example, the exemplary GUI of FIG. 4 has been generally divided into two horizontal regions, a left region 404 and a right region 406. For example, all messages generated by the local user (party A), represented by Mary 400, are displayed in the right region 406, and all messages generated by the remote user (party B), represented by Sue 402, are displayed in the left region 404. It should be appreciated that the assignment of left and right regions to parties A and B, respectively, may be reversed without departing from the spirit and scope of the instant invention. Moreover, it is anticipated that the various spatially distinct regions may overlap. That is, a message generated by Mary 400 may extend from the right region 406 and at least partially into the left region 404. Similarly, a message generated by Sue 402 may extend from the left region 404 and at least partially into the right region 406. Thus, the messages may at least partially overlap, depending on the length of the messages.

Further, depending upon the number of participants, it may be useful to define more than two spatially distinct regions. For example, where three participants are present, it may be useful to provide three horizontal regions.

In the exemplary GUI of FIG. 4, the text of the messages associated with Sue 402 is displayed in the left region and is left justified. Similarly the text of the messages associated with Mary 400 is displayed in the right region and is right justified. Those skilled in the art will appreciate that other justification schemes may be used without departing from the spirit and scope of the instant invention.

In one embodiment of the instant invention, the order in which the messages appear on the GUI generally corresponds to the order in which they were received. For example, in the illustrated embodiment of FIG. 4, each message is displayed below previously received messages so that the order of the conversation is preserved, with older messages appearing nearer the top of the GUI and newer messages appearing nearer the bottom of the GUI. As the display region of the GUI fills, old messages are scrolled up and out of view. A user may, however, activate a scrollbar mechanism 408 using conventional point and click techniques to alter the portion of the conversation presented in the GUI. For example, the user may move the scrollbar mechanism 408 upward to view an older portion of the conversation, or downward to view a more recent portion of the conversation.

To further enhance the readability and to provide further graphical identification of the author of each message appearing in the GUI, each message may be displayed in a speech balloon 410. The balloon 410 includes a tail section 412, which generally extends toward the icon associated with the author of the message. For example, each message from the user identified by the icon Mary 400 appears in a balloon 410 that has its tail section 412 extending generally toward the icon Mary 400. In the event that an icon is not associated with the author of the message, the tail section 412 is still useful to graphically illustrate the author. That is, since the GUI is divided into left and right horizontal regions, 404, 406 a speech balloon 410 located in the left horizontal region 404 with its tail section 412 extending toward the left will still provide a graphical indication of the author (e.g., Sue 402 in the embodiment of FIG. 4).

The size of the balloon 410 is controlled according to the length of the message. That is, the GUI receives a message, determines the length of the message, determines the size (e.g., based on the number of lines of text to be displayed) of the balloon 410 required to display the message, and then draws the balloon 410 with text in the appropriate horizontal portion of the GUI using the colors, style, and icon associated with the author of the message. A more detailed discussion of the sizing aspect of the speech balloons may be found below in conjunction with FIGS. 9 and 10.

During an instant messaging session it is often useful to indicate when a remote party is preparing a message to be sent. For example, after party A sends a message requesting a response, it is useful to know if party B is preparing the requested response. Knowing that the other party is about to respond allows a more natural flow to the conversation. For example, if party B does not answer a question from party A in a timely manner, party A may send a second, related request. Party B, however, may promptly respond to the first request, leaving party A to guess at whether the response applies to the first request, the second request, or both.

Accordingly, in the embodiment of the GUI shown in FIG. 3, at block 302 the software determines whether a message is being generated, and in the event that a message is being prepared, the software at block 304 delivers a signal to the other party indicating that a message is being generated. One method for determining whether a message is being generated is for the remote terminal to monitor an input field for any characters having been entered, such as via the keyboard, and report back to the local terminal. For example, if the software detects that a keystroke has been entered or that emoticons have been selected, then it assumes that a message is being prepared to be sent to the other party, and the software sends a signal indicating that a possible responsive message is being prepared.

Figure 5A:
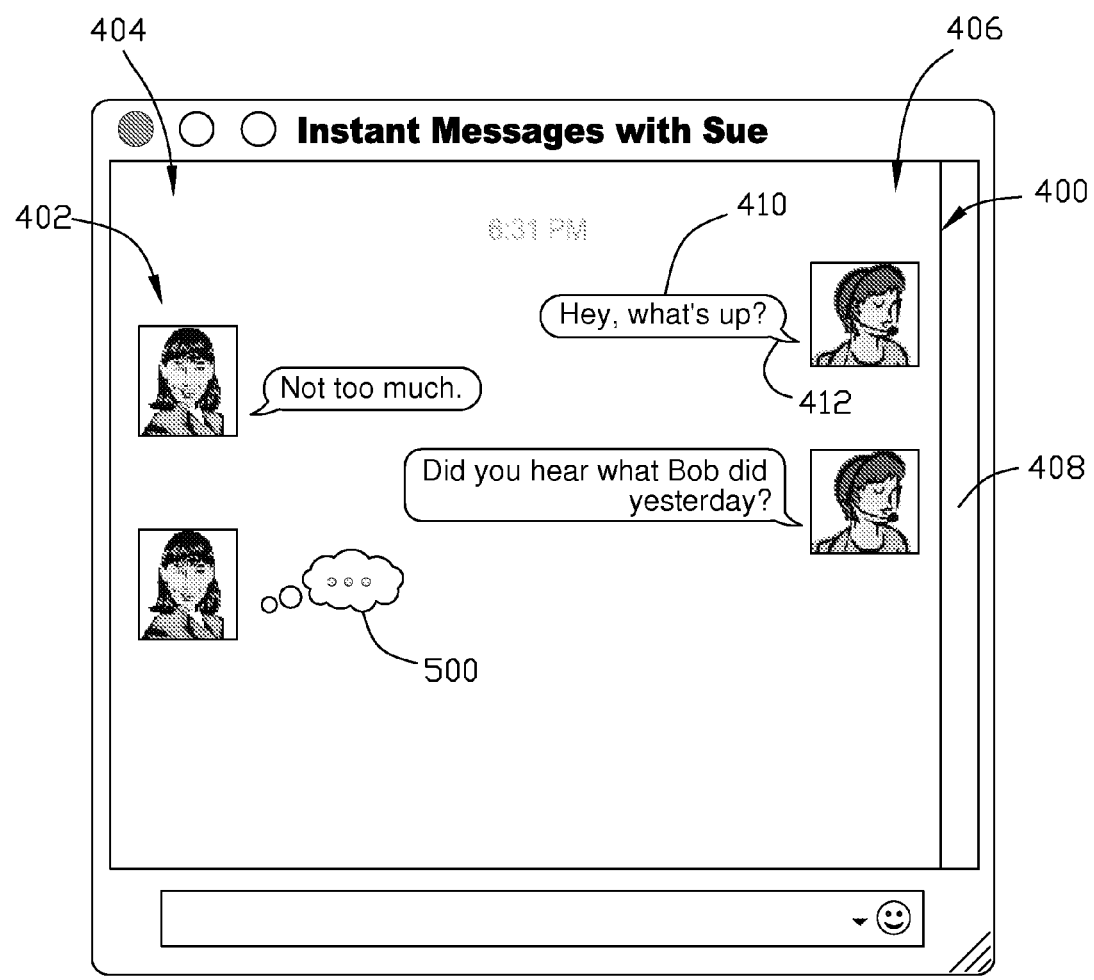
FIGS. 5A-5B illustrate a second and third view of exemplary screens representative of a graphical user interface.
Figure 5B:
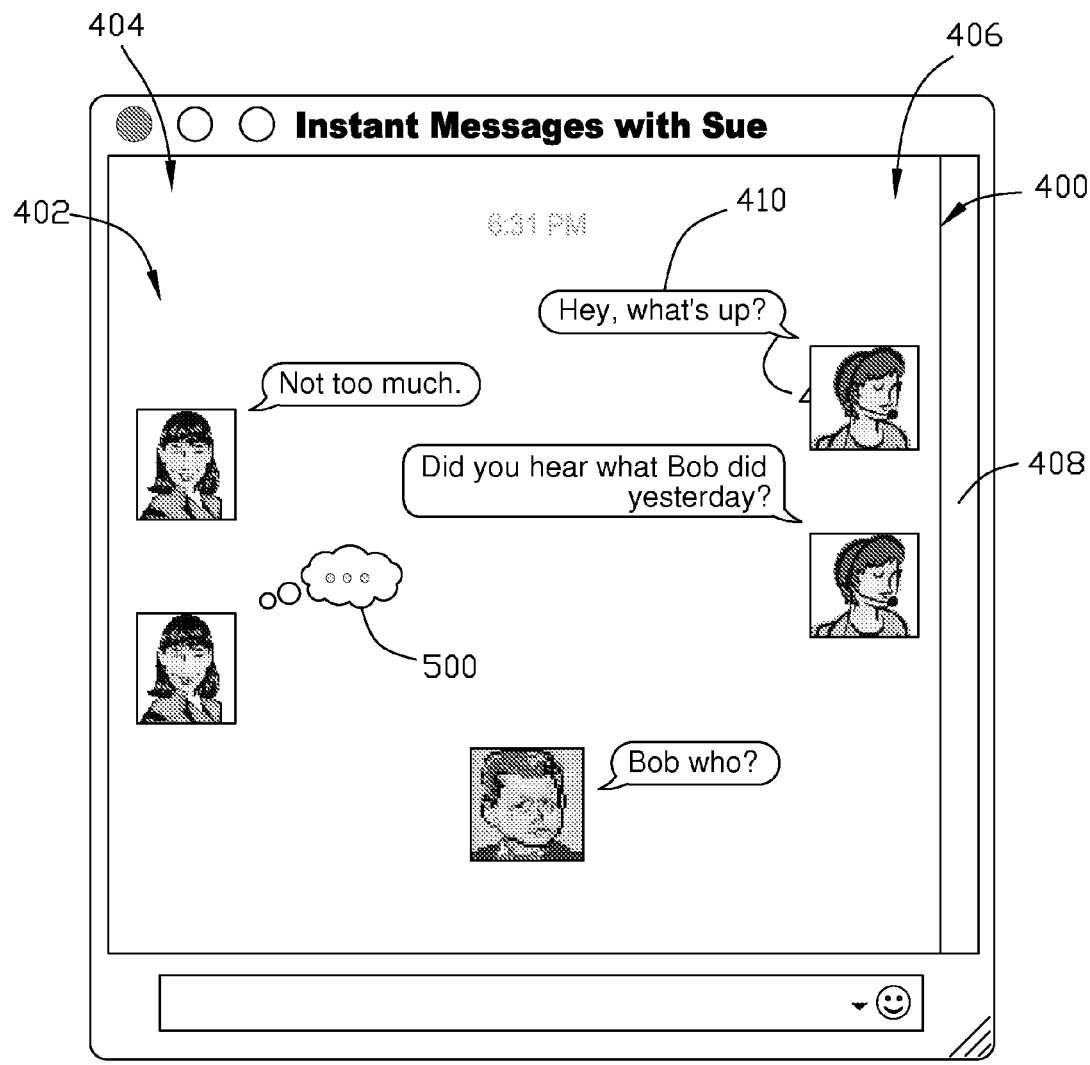

At block 306, the software checks for a signal from the other remote party indicating that a message is being prepared. If such a signal is received, control transfers to block 308 where the GUI is activated to produce a graphical indication that a message is being prepared by the other party. An exemplary representation of the graphical indicator is shown in the exemplary GUI of FIG. 5. For example, a "thought bubble," such as is often used in comic strips to indicate that a character is thinking, is displayed along with the icon associated with the party who is preparing the message. In the exemplary embodiment of FIG. 5, a "thought bubble" 500 provides a graphical indication that Sue 402 is currently preparing a message. For a number of reasons, the thought bubble 500 is particularly efficient for conveying the idea that the other party is preparing a response. First, the thought bubble 500 appears in the GUI in the same general region that a message would be displayed. Second, thought bubbles are common graphical representations familiar to many users. Third, because the thought bubble 500 is graphically similar to, but easily distinguishable from, the speech balloon 410, the user may intuitively understand its function as a precursor to an actual message. Accordingly, even inexperienced users may readily understand the function and operation of the instant messaging system, and will be able to more quickly participate in an instant messaging session at a higher level of proficiency.

In an alternative embodiment, incomplete or partial messages are communicated to the recipient as an indication that a message is being prepared. In this alternative embodiment, the partial message is accompanied by a graphic indication that the message is not yet complete, such as by " . . . ." The partial messages are then periodically updated as more of the message is produced by the sender.

At block 310, the software checks to determine if a message has been received from the other party. If so, control transfers to block 312 where the software displays the text message (or emoticon, or the like) along with the icon associated with the author. In this instance, any corresponding thought bubble is replaced by the corresponding speech balloon and its accompanying text. In the illustrated embodiments of FIGS. 4 and 5, the messages received from the other, remote party are displayed on the left side 404 of a display window in the GUI. Additionally, the text message is presented in a speech balloon 410 and is left justified to further enhance its association with the other, remote party.

At block 314, the software checks to determine if the message being prepared by the local party is complete. If so, control transfers to block 316 and the software delivers the message over the network connection to the other party. The message is then displayed in the speech balloon 410 in replacement of the thought balloon. Additionally, the software displays the text message (or emoticon, or the like) along with the icon associated with the author in the local GUI. In the illustrated embodiments of FIGS. 4 and 5, the messages produced by the local party are displayed on the right side 406 of a display window in the GUI. Additionally, the text message is presented in a speech balloon 410 and is right justified to further enhance its association with the local party.

Those skilled in the art will appreciate that while the instant invention has been depicted in exemplary embodiments in which there are two participants to an instant messaging session, the instant invention may be readily employed in instant messaging sessions involving three or more participants. In one embodiment, all locally generated messages are presented on the right side 406 of the display window in the GUI, and all remotely generated messages are presented on the left side 404 of the display window. Thus, where there are two or more remote participants, each of their messages are presented on the left side 404 of the local participant's display window. In other embodiments, each remote participant's messages could be displayed in a spatially distinct region from that of the other participants. For example, messages from first, second and third remote participants could be displayed in first, second and third regions, respectively, wherein the first, second and third regions are spatially distinct. In the embodiment shown in FIG. 5B, a third participant is assigned to a central region, with his/her icon appearing in the central region and the associated speech bubble extending generally therefrom.

Additionally, while the embodiments described herein have been shown with the GUI divided into spatially distinct horizontal regions, it is envisioned that other embodiments may spatially distinguish the various participants in other manners without departing from the spirit and scope of the instant invention. For example, the various participants may be distinguished by dividing the GUI into spatially distinct vertical regions with each participant being assigned a vertical portion of the GUI. For example, the local participant may be assigned the top region of the GUI, and the remote participant may be assigned the bottom region. Additional remote participants may be grouped together or, as described above, assigned an intermediate region, such as a vertical middle region. In a GUI with vertically distinct regions it may also be useful to allow the conversation to scroll horizontally, as opposed to the common vertical scrolling employed in many instant messaging systems. For example, more recent messages may be displayed to the right of older messages, with older messages scrolling off the left side of the GUI as the conversation advances.

If the messaging session is complete, such as by one or both of the parties logging off of the network or otherwise shutting down the software, then block 318 detects the ending of the session and transfers control out to another program responsible for a proper and orderly winding up of the program (block 320). Otherwise, if the instant messaging session continues, then control transfers back to block 302 where the process repeats.

Figure 6:
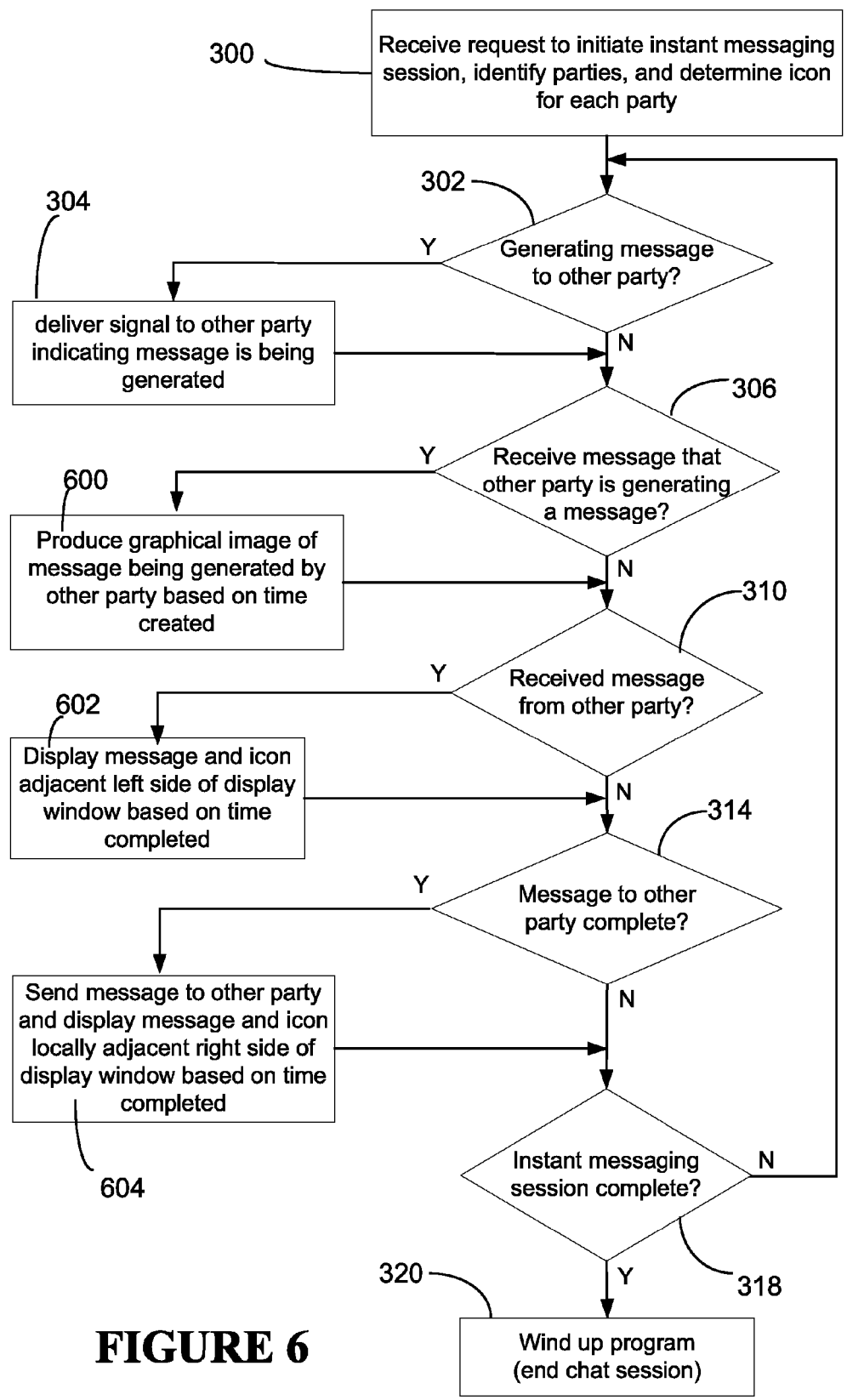
FIG. 6 illustrates a flowchart of an alternative embodiment of a graphical user interface that may be executed by components within the system of FIG. 1.

Turning now to FIG. 6, an alternative embodiment of at least a portion of the software shown in FIG. 3 is illustrated. In this embodiment of the software, provision is made to preserve the order of a conversation during those instances in which a first party is preparing a response but the second party nevertheless sends a response before the first party completes and sends its response. For example, consider the instant messaging session shown in FIG. 7 to illustrate an out-of-order presentation of messages in a conversation. In the embodiment illustrated in FIG. 7, Sue 402 is in the process of preparing a response to a message 700 generated by Mary 400. Accordingly, a thought bubble 702 is positioned adjacent the Sue icon 402 below the message 700. Mary 400, however, did not wait for Sue's response, but sent a message 704. Thus, once Sue 402 completes and sends the response, the thought bubble 702 will be replaced by a speech balloon (not shown) containing the message. If the speech balloon (not shown) merely replaces the thought bubble with re-ordering, then the conversation will appear to have occurred in the order 700-702-704, even though the speech bubble replacing the thought bubble 702 occurred after, not before the speech bubble 704. This out-of-sequence ordering may give rise to confusion, particularly where the participants read the flow of the conversation at a subsequent time.

The flowchart of FIG. 6 illustrates one embodiment of a method useful in reordering the speech balloons so that they appear in the GUI in the order in which they actually occurred. Generally, the process set forth in FIG. 3 is substantially similar to that of FIG. 6, with the exception of blocks 600, 602, and 604. Generally, the order of the speech balloons is maintained based upon the time that the message was completed. Thought bubbles, on the other hand, are ordered based upon the time that they were created and are subsequently replaced by a speech balloon. Because a thought bubble may be created well before the corresponding speech balloon is completed, it is possible for other parties to complete messages in the intervening time. Thus, when the corresponding speech bubble is completed and replaces the corresponding thought bubble, the order of the speech balloons may vary.

At block 306, the software checks for a signal from the other remote party indicating that a message is being prepared. If such a signal is received, control transfers to block 600 where the GUI is activated to produce a graphical indication that a message is being prepared by the other party. The order in which the graphical indication is displayed is based upon the time that the thought bubble was created. The time that the thought bubble was created may be determined from a time stamp provided by the remote user who is in the process of preparing the message.

Thereafter, at block 310, the software checks to determine if a message has been received froth other party. If so, control transfers to block 602 where the software displays the text message (or emoticon, or the like) along with the icon associated with the author. In this instance, any corresponding thought bubble is removed and replaced by the corresponding speech balloon and its accompanying text. However, the speech balloon is ordered based upon the time completed. The time that the speech bubble was completed may be determined from a time stamp provided by the remote user who generated the message.

Figure 7:
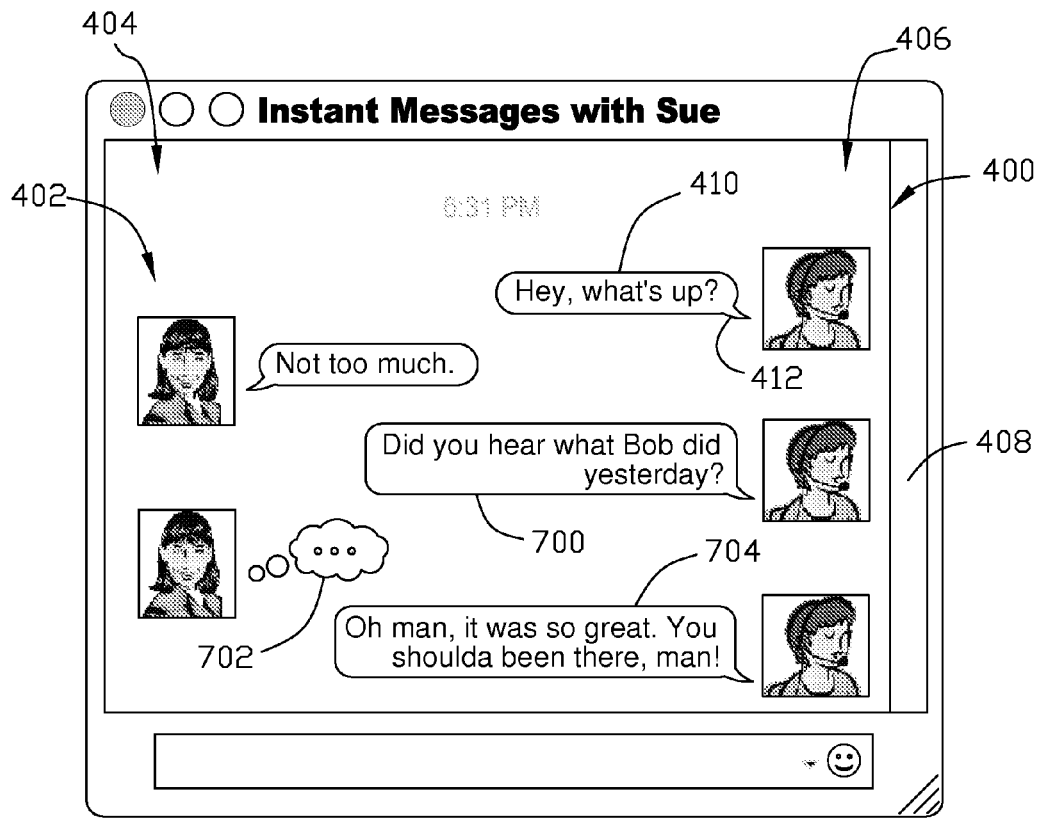
FIG. 7 illustrates a view of an exemplary screen representative of a graphical user interface.
Figure 8:
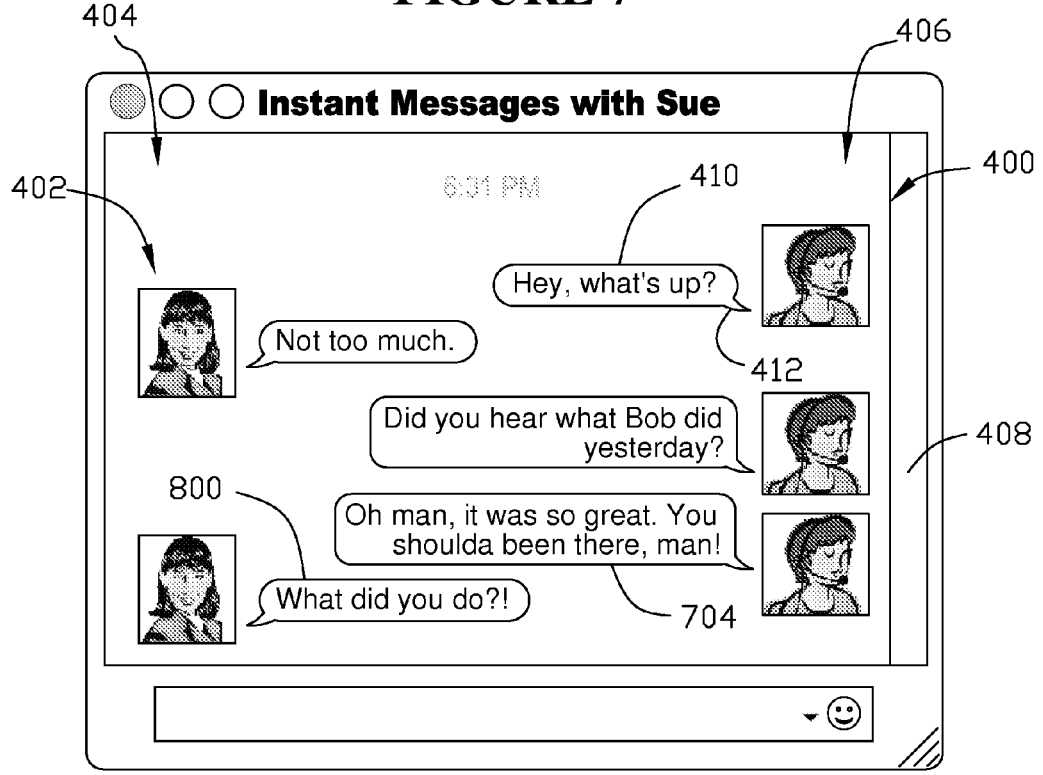
FIG. 8 illustrates an alternative view of the exemplary screen of FIG. 7.

An exemplary instant messaging session that illustrates the results of this ordering policy is presented in FIGS. 7 and 8. In the embodiment illustrated in FIG. 7, Sue 402 is in the process of preparing a response to a message 700 generated by Mary 400. Accordingly, a thought bubble 702 is positioned adjacent the Sue icon 402 below the message 700. Mary 400, however, did not wait for Sue's response, but sent a message 704. Because the speech balloons 700, 704 are ordered based on the time completed whereas the thought balloon 702 is ordered based on the time created, the order of the messages will remain as shown in FIG. 7, until the message from Sue 402 is finally received.

Thus, as is shown in FIG. 8, a speech balloon 800 has replaced the thought bubble 702, but is located after (or below) the speech balloon 704, as the speech balloon 800 was completed after the speech balloon 704. In this manner, the actual order of the conversation is preserved.

A substantially similar process occurs with respect to displaying speech balloons associated with the local user. For example, at block 314, the software checks to determine if the message being prepared by the local party is complete. If so, control transfers to block 604 and the software delivers the message over the network connection to the other party. The message is then displayed in a speech balloon in an order based on the time that the message was completed.

Turning now to FIGS. 9 and 10, one exemplary method for formatting and sizing the speech balloon 410 is shown. In one embodiment, a text system, such as a standard text system used in Mac OS X is used to produce the text of the message. The text system provides information regarding the size of the text message to the GUI. The GUI uses this size information to construct a speech balloon of an appropriate size to contain the message. Certain rules regarding the formatting of the speech balloon affect the size of the speech balloon. For example, in one embodiment, upper, lower, left and right margins are established. In the exemplary embodiment illustrated in FIG. 9A, the margins are selected as follows: upper −3; lower −5; left −13; and right −6. The text of the message is required to be positioned within the speech balloon and within these margins. Using these margins causes the speech balloon to fit tightly around the message, as illustrated in FIG. 9B, so as to be aesthetically pleasing while not unnecessarily consuming large portions of the GUI. Reducing the size of the speech balloons allows more messages to appear on the GUI at one time.

The GUI uses the information regarding the size of the text message and the desired margins to produce a speech balloon of the appropriate size. The process involves dividing a template speech balloon into nine regions, such as is shown in FIG. 10A. The nine regions are comprised of four corners, left and right edges, top and bottom edges, and a central region. Initially, the margins are added to the rectangular area taken up by the text to produce a destination rectangle having dimensions in which the balloon is to be drawn. The foul corner regions are drawn directly into the corners of the destination rectangle without significant change to their shape or size. The top and bottom edges are tiled horizontally into rectangles of the appropriate width (and original height). Varying the width of the top and bottom edges has the desirable effect of altering the horizontal dimension of the speech balloon. The left and right edges are tiled vertically into rectangles of the appropriate height (and original width) to produce a stretched or modified speech bubble 1000, as shown in FIG. 10B. It should be noted that the destination rectangle can be smaller than the original template image in either or both its vertical and horizontal dimension. For example, in the embodiment illustrated in FIG. 10B, the vertical dimension of the speech balloon is smaller that the vertical dimension of the template speech balloon of FIG. 10A, and the horizontal dimension of the speech balloon is larger that the horizontal dimension of the template speech balloon of FIG. 10A.

Once the speech balloon is appropriately sized, it is color filled according to the requirements of the sender or the recipient, as discussed above. Coloration and shading of the speech balloon is accomplished by alternative methodologies. In one embodiment, custom artwork is provided for each color to produce a desired variation across the surface of the speech balloon. For example, the color may be varied so that the coloration is lighter adjacent the bottom edge of the speech balloon. This coloration scheme has proven to be pleasing to users, providing the appearance of three dimensional qualities to the speech balloon. Alternatively, rather than developing custom artwork for each possible color, the speech balloon may be filled uniformly with the desired color. Thereafter, standard template shadows may be overlayed to produce a similar three dimensional effect.

Finally, while FIGS. 9 and 10 illustrate the speech balloon 410 drawn with its tail extending leftward, so as to be used in the left horizontal region of the GUI, the same processes described herein may be applied in drawing the speech balloon 410 with its tail extending rightward, so as to be used in the right horizontal region of the GUI. In particular, when the speech balloon 410 with a rightward extending tail is required, the speech balloon 410 with the leftward extending tail is designed to be of the proper size for the message, and then the speech balloon 410 is flipped horizontally or rotated about a central vertical axis to produce the appropriately sized speech balloon 410 with a rightward extending tail. In this manner, an economy of software coding is realized, as only a single routine for generating speech balloon with either leftward or rightward extending tails is required.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:

at a computing device with a display:

displaying a communication session window on the display, the communication session window partitioned to display instant messages from a first participant in speech balloons in a right region of the communication session window and instant messages from a second participant in speech balloons in a left region of the communication session window during an instant messaging session between the first participant and the second participant, wherein instant messages in the instant messaging session are displayed vertically in the communication session window based on a time order in which the instant messages are received;

receiving a signal indicating the second participant is preparing an instant message;

in response to receiving the signal indicating the second participant is preparing an instant message, displaying a thought bubble in the left region of the communication session window, wherein a vertical position of the thought bubble in the left region is based on a time that the thought bubble was created;

while displaying the thought bubble in the left region of the communication session window, receiving an instant message from the first participant;

in response to receiving the instant message from the first participant, displaying a speech balloon containing the instant message from the first participant in the right region of the communication session window, wherein the vertical position of the speech balloon containing the instant message from the first participant in the right region is below the vertical position of the thought bubble in the left region;

while displaying the thought bubble in the left region and the speech balloon containing the instant message from the first participant in the right region, receiving the instant message prepared by the second participant that corresponds to the thought bubble in the left region; and, in response to receiving the instant message prepared by the second participant that corresponds to the thought bubble in the left region:

ceasing to display the thought bubble in the left region; and displaying a speech balloon containing the instant message prepared by the second participant in the left region of the communication session window, wherein the vertical position of the speech balloon containing the instant message from the first participant in the right region is above the vertical position of the speech balloon containing the instant message prepared by the second participant in the left region.

2. A portable electronic device, comprising:

a touch screen display;

one or more processors;

memory; and one or more programs, wherein the one or more programs are stored in the memory and configured to be executed by the one or more processors, the one or more programs including instructions for:

displaying a communication session window on the display, the communication session window partitioned to display instant messages from a first participant in speech balloons in a right region of the communication session window and instant messages from a second participant in speech balloons in a left region of the communication session window during an instant messaging session between the first participant and the second participant, wherein instant messages in the instant messaging session are displayed vertically in the communication session window based on a time order in which the instant messages are received;

receiving a signal indicating the second participant is preparing an instant message;

in response to receiving the signal indicating the second participant is preparing an instant message, displaying a thought bubble in the left region of the communication session window, wherein a vertical position of the thought bubble in the left region is based on a time that the thought bubble was created;

while displaying the thought bubble in the left region of the communication session window, receiving an instant message from the first participant;

in response to receiving the instant message from the first participant, displaying a speech balloon containing the instant message from the first participant in the right region of the communication session window, wherein the vertical position of the speech balloon containing the instant message from the first participant in the right region is below the vertical position of the thought bubble in the left region;

while displaying the thought bubble in the left region and the speech balloon containing the instant message from the first participant in the right region, receiving the instant message prepared by the second participant that corresponds to the thought bubble in the left region; and, in response to receiving the instant message prepared by the second participant that corresponds to the thought bubble in the left region:

ceasing to display the thought bubble in the left region; and displaying a speech balloon containing the instant message prepared by the second participant in the left region of the communication session window, wherein the vertical position of the speech balloon containing the instant message from the first participant in the right region is above the vertical position of the speech balloon containing the instant message prepared by the second participant in the left region.

3. A non-transitory computer readable storage medium storing one or more programs, the one or more programs comprising instructions, which when executed by a portable electronic device with a touch screen display, cause the device to:

display a communication session window on the display, the communication session window partitioned to display instant messages from a first participant in speech balloons in a right region of the communication session window and instant messages from a second participant in speech balloons in a left region of the communication session window during an instant messaging session between the first participant and the second participant, wherein instant messages in the instant messaging session are displayed vertically in the communication session window based on a time order in which the instant messages are received;

receive a signal indicating the second participant is preparing an instant message;

in response to receiving the signal indicating the second participant is preparing an instant message, display a thought bubble in the left region of the communication session window, wherein a vertical position of the thought bubble in the left region is based on a time that the thought bubble was created;

while displaying the thought bubble in the left region of the communication session window, receive an instant message from the first participant;

in response to receiving the instant message from the first participant, display a speech balloon containing the instant message from the first participant in the right region of the communication session window, wherein the vertical position of the speech balloon containing the instant message from the first participant in the right region is below the vertical position of the thought bubble in the left region;

while displaying the thought bubble in the left region and the speech balloon containing the instant message from the first participant in the right region, receive the instant message prepared by the second participant that corresponds to the thought bubble in the left region; and, in response to receiving the instant message prepared by the second participant that corresponds to the thought bubble in the left region:

cease to display the thought bubble in the left region; and display a speech balloon containing the instant message prepared by the second participant in the left region of the communication session window, wherein the vertical position of the speech balloon containing the instant message from the first participant in the right region is above the vertical position of the speech balloon containing the instant message prepared by the second participant in the left region.

\* \* \* \* \*